United States Patent [19]

Voss et al.

[11] 4,446,953

[45] May 8, 1984

[54] CLUTCH OIL SHIELD AND DIVERTER

[75] Inventors: Julian D. Voss, Naperville; Aldo Allori, Brookfield; John A. Wilger, Chicago, all of Ill.

[73] Assignee: International Harvester Co., Chicago, Ill.

[21] Appl. No.: 322,149

[22] Filed: Nov. 17, 1981

[51] Int. Cl.³ ............................................. F16D 13/72
[52] U.S. Cl. ................................ 192/70.12; 192/112; 192/113 B
[58] Field of Search ................. 192/70.12, 112, 113 B; 188/264 CC, 264 E

[56] References Cited

U.S. PATENT DOCUMENTS

| | | | |
|---|---|---|---|
| 2,091,269 | 8/1937 | Colman | 192/70.12 X |
| 2,964,137 | 12/1960 | Luedtke et al. | 188/264 CC |
| 2,968,368 | 1/1961 | Schjolin et al. | 188/264 E X |
| 2,981,376 | 4/1961 | Zeidler | 188/73 |
| 3,042,169 | 7/1962 | Schwartz | 192/113 B |
| 3,202,253 | 8/1965 | Merritt et al. | 192/113 |
| 3,217,844 | 11/1965 | Nelson et al. | 188/264 |
| 3,251,437 | 5/1966 | Moyer | 188/264 |
| 3,366,210 | 8/1965 | Webster | 192/70.12 X |
| 3,695,407 | 10/1972 | Peery | 192/113 B |
| 3,912,060 | 10/1975 | Handke | 192/113 B |
| 4,004,670 | 1/1977 | Nerstad et al. | 192/105 A |
| 4,113,067 | 9/1978 | Coons et al. | 192/70.12 X |

FOREIGN PATENT DOCUMENTS

| | | | |
|---|---|---|---|
| 1242615 | 12/1959 | France | 192/113.2 |
| 34404 | of 1881 | United Kingdom | 192/113 B |

Primary Examiner—Rodney H. Bonck
Assistant Examiner—David D. House
Attorney, Agent, or Firm—Boris Parad; F. David AuBuchon

[57] ABSTRACT

A hydraulic fluid shield and diverter encompassing the multiple disc clutch transmitting torque from input shaft to an output shaft, intensifying the cooling effect of the hydraulic fluid passing through the clutch and also reducing aeration of the fluid entering the vehicle hydraulic system.

6 Claims, 3 Drawing Figures

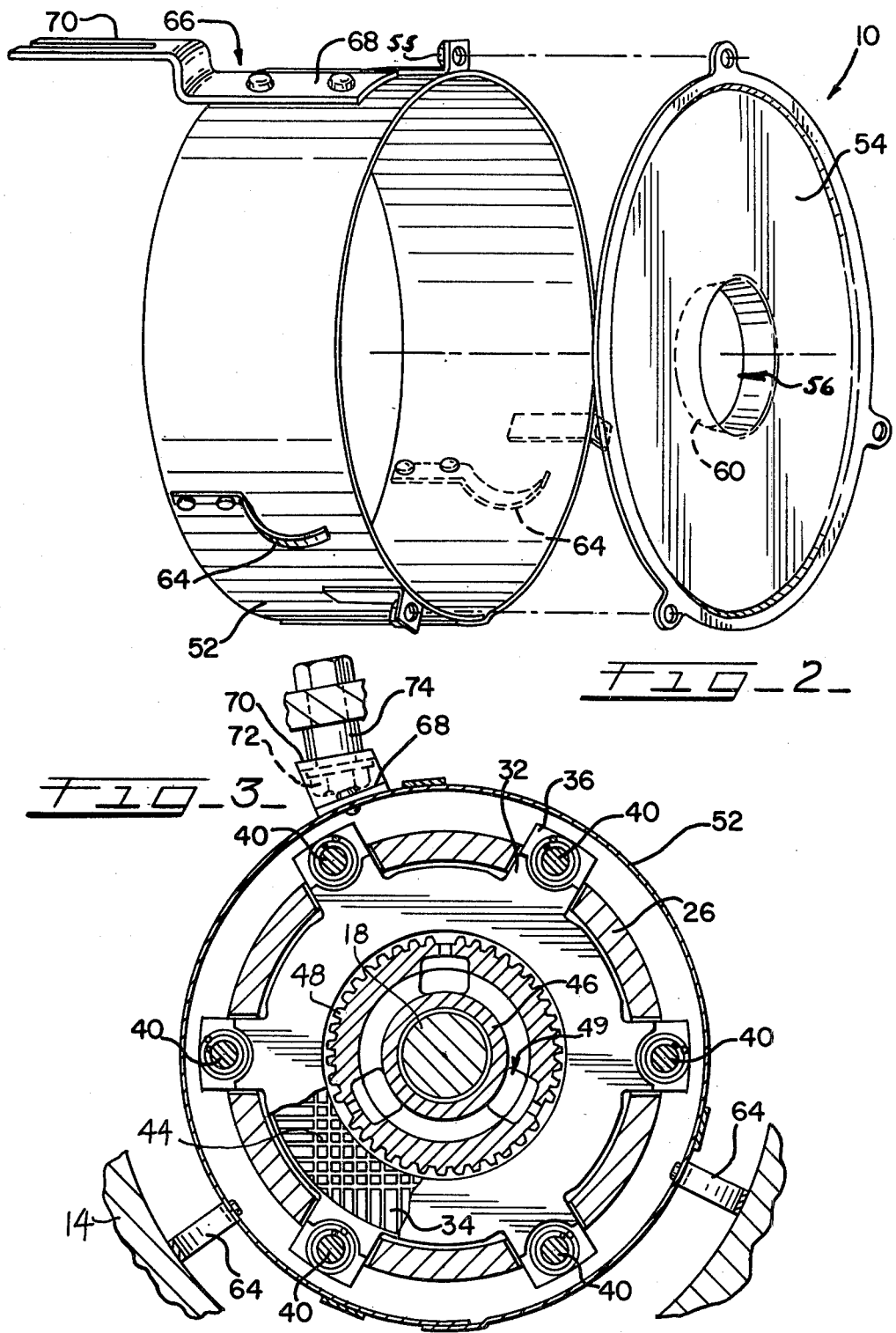

CLUTCH OIL SHIELD AND DIVERTER

BACKGROUND OF THE INVENTION

1. Field of the Invention

This invention relates to wet clutches of a self-propelled vehicle transmission and more particularly to an oil shield and diverters for the hydraulic fluid flow passing through a multiple disk clutch.

2. Description of the Prior Art

Heretofore, numerous attempts have been made to divert the fluid flow to or around the torque transmitting clutches, as exemplified in the following patents. For instance, the U.S. Pat. No. 4,004,670, discloses a self-modulated clutch with drag-reduction valve which includes an annular retainer element communicating with the self-modulating mechanism.

Another U.S. Pat. No. 3,366,210 discloses a wet clutch lubricating system having a reservoir upper wall with deflector means thereon for catching fluid propelled by rotation of the driving member and directing it into the reservoir.

However, none of the prior art references of record discloses or teaches the novel design of the oil clutch oil shield and diverter as disclosed in the subject invention hereinbelow.

SUMMARY OF THE INVENTION

According to the invention, a hydraulic fluid shield immersed in the fluid bath comprises a peripheral wall encompassing and coaxial with a multiple disc clutch. A shield cover is rigidly attached to one side of the peripheral wall thereby blocking the fluid entry into the clutch. The cover has a center opening defined by an annular baffle extending transversely to the cover. A clutch hub has a portion thereof being located within the center opening. This clutch hub portion and the annular baffle form a passage for the fluid entry into the clutch thereby improving a cooling effect of the fluid passing through the clutch. The hydraulic fluid diverted into the clutch through the passage is entrained into and ejected from the clutch due to the centrifugal force exerted thereon. The shield diverts the ejected fluid carrying air bubbles generated by fluid rotation into the fluid bath and away from a hydraulic system entry, thereby reducing fluid aeration near the system entry.

BRIEF DESCRIPTION OF THE DRAWINGS

FIG. 2 is an exploded perspective view of the clutch oil shield and diverter; and FIG. 3 is a cross-sectional view taken substantially along the line 3—3 of FIG. 1.

DESCRIPTION OF THE PREFERRED EMBODIMENT

Figure 1:
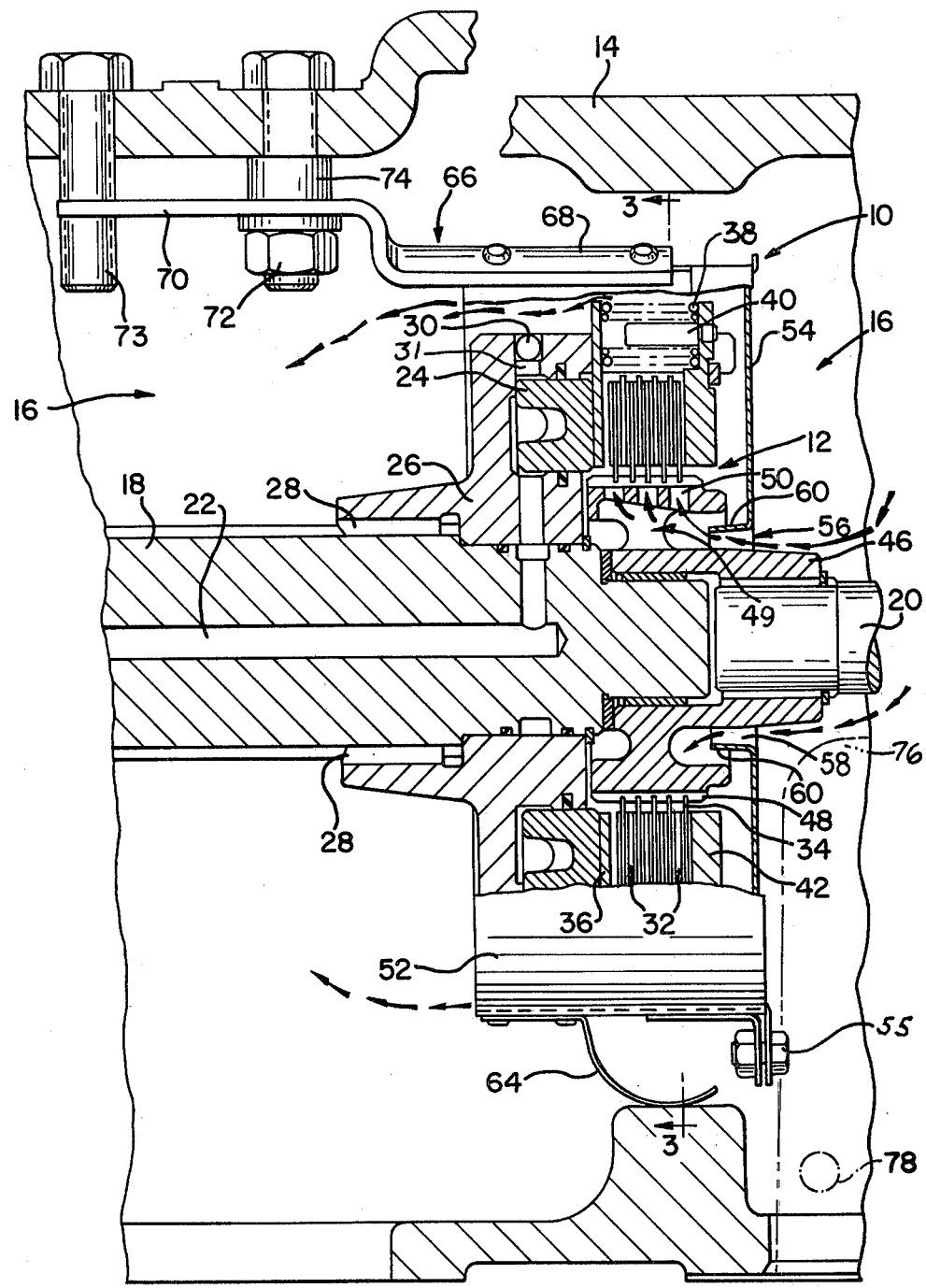
FIG. 1 is a side cross-sectional view of a clutch oil shield and diverter encompassing the multiple disc clutch.

Referring now to the drawings wherein reference characters designate like or corresponding parts throughout the several views, there is shown in FIG. 1 a clutch oil shield and diverter 10 encompassing a multiple disc clutch 12 of a self-propelled vehicle such as an agricultural tractor or the like. The clutch 12 is disposed in the transmission casing 14 within a fluid, usually oil or the like substance, bath 16. The clutch 12 transmits torque from an input shaft 18 to an output shaft 20 which in turn transmits the torque to front wheels of the vehicle (not shown).

The input shaft has a channel 22 supplying oil to the clutch piston 24 movable within the clutch carrier 26. The clutch carrier 26 is rigidly attached to the input shaft 18 by splines 28. The clutch carrier 26 comprises a plug ball 30 blocking a service channel 31. The carrier 26 is securely affixed to separator plates 32 extending transversely to the shaft 18 and frictionally engageable with friction discs 34, which are alternatively interleaved between separator plates 32 for conjoint rotation. A front plate 36 movable by the piston 24 squeezes a piston return spring 38, having a support dowel 40 therein, for engagement of friction discs 34 and separator plates 32 in order to transfer torque from the input shaft 18 to the output shaft 20. The back plate 42 arrests the longitudinal movement of said friction discs 34 and separator plates 32.

The friction discs 34, having a groove pattern 44 as shown in FIG. 3, are attached to a clutch hub 46 by means of splines 48. The clutch hub 46 splined with the shaft 20 contains a plurality of circumferentially spaced intake chambers 49, each of them perforated by a plurality of intake ports 50.

A clutch oil shield 10 comprises a tubular peripheral wall 52 coaxial with the shafts 18 and 20. A flat circular cover 54 is secured to one side of the wall 52, thereby blocking the fluid entry into the clutch 12, by bolts 55 or other suitable mechanical means. The cover 54 has a center opening 56 defined by an annular baffle 60 extending transversely to the cover 54 and forming a passage 58 for the hydraulic fluid flow moving into the clutch 12 from the fluid bath 16. The shield 10 is held stationary within the transmission casing 14 by means of spring locators 64 equidistantly spaced about the peripheral wall 52 and a support bracket 66 rigidly attached to the wall 52 at one end 68 and to the transmission casing 14 at its another bifurcated end 70. The bifurcated end 70 is connected to the transmission casing 14 by a bolt 72 which may include a spacer 74 and an alignment screw 73.

A filter canister 76 is disposed in the vicinity of the oil shield and diverter 10 at the entry 78 into the hydraulic system of the vehicle. The entry 78 is schematically shown in FIG. 1.

In operation, the hydraulic fluid such as oil, or the like substance, disposed in the transmission fluid bath is entrained into and ejected from the clutch due to the centrifugal force exerted thereon by friction discs rotation. The rotating discs act somewhat like a centrifugal pump ejecting the oil radially outwardly between the adjacent discs and separator plates. Since the clutch is enclosed with the shield the fluid drawn into the clutch must pass only through the passage between the cover annular baffle and the clutch hub in order to get into the clutch intake chambers. This forced diversion of the hydraulic fluid into the intake chambers improves the cooling of the clutch. The fluid entering into the intake chamber is forced to go through intake ports into the grooves of the friction discs. These intake ports serve to conduct the hydraulic fluid outwardly to friction discs in order to dissipate heat generated by frictional engagement of the discs and separator plates. The fluid ejected from the clutch is guided or diverted by the peripheral wall and shield cover into the fluid bath in the same direction as the clutch entering fluid flow and also away from the hydraulic system entry thereby reducing fluid aeration near said system entry.

The subject clutch oil shield and diverter significantly improves delivery of the hydraulic fluid into the clutch thereby improving a cooling effect of the fluid passing through the rotating discs. The diverter also decreases aeration of the hydraulic fluid entering the hydraulic system of the vehicle by diverting the fluid ejected from the clutch away from the entry to the vehicle hydraulic system. Directing the ejected fluid carrying air bubbles generated by the clutch rotation of fluid, in the same direction as the clutch entering fluid flow facilitates dissolution of the air bubbles into the body of the fluid bath far away from the filter canister at the entry to the vehicle hydraulic system.

The foregoing description and drawings merely illustrate the invention and the invention is not limited thereto, except insofar as the amended claims are so limited, and so those skilled in the art who will have the disclosure before them will be able to make modifications and variations therein without departing from the scope of the invention.

What is claimed is:

1. A hydraulic fluid shield immersed in a fluid bath and comprising:
    a peripheral wall with an open one end and coaxially encompassing a multiple disc clutch;
    a shield cover rigidly attached to another end of said peripheral wall and blocking a fluid entry into said clutch;
    said cover having a center opening defined by an annular baffle extending transversely to said cover;
    a clutch hub having a portion thereof located within said center opening;
    said clutch hub portion and said annular baffle forming a passage for the fluid entry into said clutch thereby improving a cooling effect of the fluid flowing through said clutch; and
    whereby the hydraulic fluid diverted into said clutch through said passage is entrained into and ejected from said clutch due to the centrifugal force exerted thereon.

2. The hydraulic fluid shield according to claim 1, and said shield cover having a flat circular configuration and said peripheral wall having a tubular shape.

3. A hydraulic fluid shield immersed in a fluid bath and comprising:
    a peripheral wall encompassing and coaxial with a multiple disc clutch;
    a shield cover rigidly attached to one side of said peripheral wall and blocking a fluid entry into said clutch;
    said cover having a center opening defined by an annular baffle extending transversely to said cover;
    a clutch hub having a portion thereof located within said center opening;
    said clutch hub portion and said annular baffle forming a passage for the fluid entry into said clutch thereby improving a cooling effect of the fluid flowing through said clutch;
    whereby the hydraulic fluid diverted into said clutch through said passage is entrained into and ejected from said clutch due to the centrifugal force exerted thereon;
    said shield located in a transmission casing and held stationary therein by locating means;
    said locating means comprising spring locators attached to said shield and peripherally disposed thereabout; and
    a bracket means rigidly connecting said shield with said transmission casing.

4. A hydraulic fluid shield immersed in a fluid bath and comprising:
    a peripheral wall encompassing and coaxial with a multiple disc clutch;
    a shield cover rigidly attached to one side of said peripheral wall and blocking a fluid entry into said clutch;
    said cover having a center opening defined by an annular baffle extending transversely to said cover;
    a clutch hub having a portion thereof located within said center opening;
    said clutch hub portion and said annular baffle forming a passage for the fluid entry into said clutch thereby improving a cooling effect of the fluid flowing through said clutch;
    whereby the hydraulic fluid diverted into said clutch through said passage is entrained into and ejected from said clutch due to the centrifugal force exerted thereon;
    said transmission casing comprising filter means disposed at said hydraulic system entry;
    said shield diverting said ejected fluid away from said filter means hydraulic fluid and in the direction of the flow entering through said passage;
    said shield diverting the ejected fluid carrying air bubbles generated by fluid rotation into the fluid bath and away from a hydraulic system entry, thereby reducing fluid aeration near said system entry.

5. In a vehicle transmission comprising:
    a transmission casing enclosing an input shaft coaxially disposed and engageable with an output shaft in the hydraulic fluid bath via a multiple disc clutch for transmission of torque, a clutch hub mounted on said output shaft and having a plurality of fluid intake chambers extending radially and circumferentially therein;
    said chambers perforated by a plurality of intake ports for communicating said fluid into the space between interleaved revolving friction discs and separator plates of said clutch, a hydraulic fluid shield comprising:
    a peripheral wall encompassing said clutch;
    a shield cover rigidly affixed to said peripheral wall and comprising an opening;
    locating means holding said shield stationary with regard to said transmission casing;
    said cover guiding the hydraulic fluid flow from said fluid bath into said intake chambers through said opening;
    said fluid being ejected radially outwardly into said space by centrifugal force produced by said revolving friction discs for dissipation of heat generated by frictional engagement of said discs and plates; and
    said shield diverting centrifugally pumped fluid away from the entry into a vehicle hydraulic system in order to reduce hydraulic fluid aeration therein.

6. The hydraulic fluid shield according to claim 5, wherein:
    said shield comprises a peripheral tubular wall coaxial with said shafts and said hub within said transmission casing:
    said cover having a center annular baffle extending transversely thereto, defining said opening and forming a passage with said clutch hub for the fluid flow entry from said fluid bath into said intake chambers, thereby intensifying clutch cooling effect of the fluid passing through said clutch.

* * * * *